UNITED STATES PATENT OFFICE.

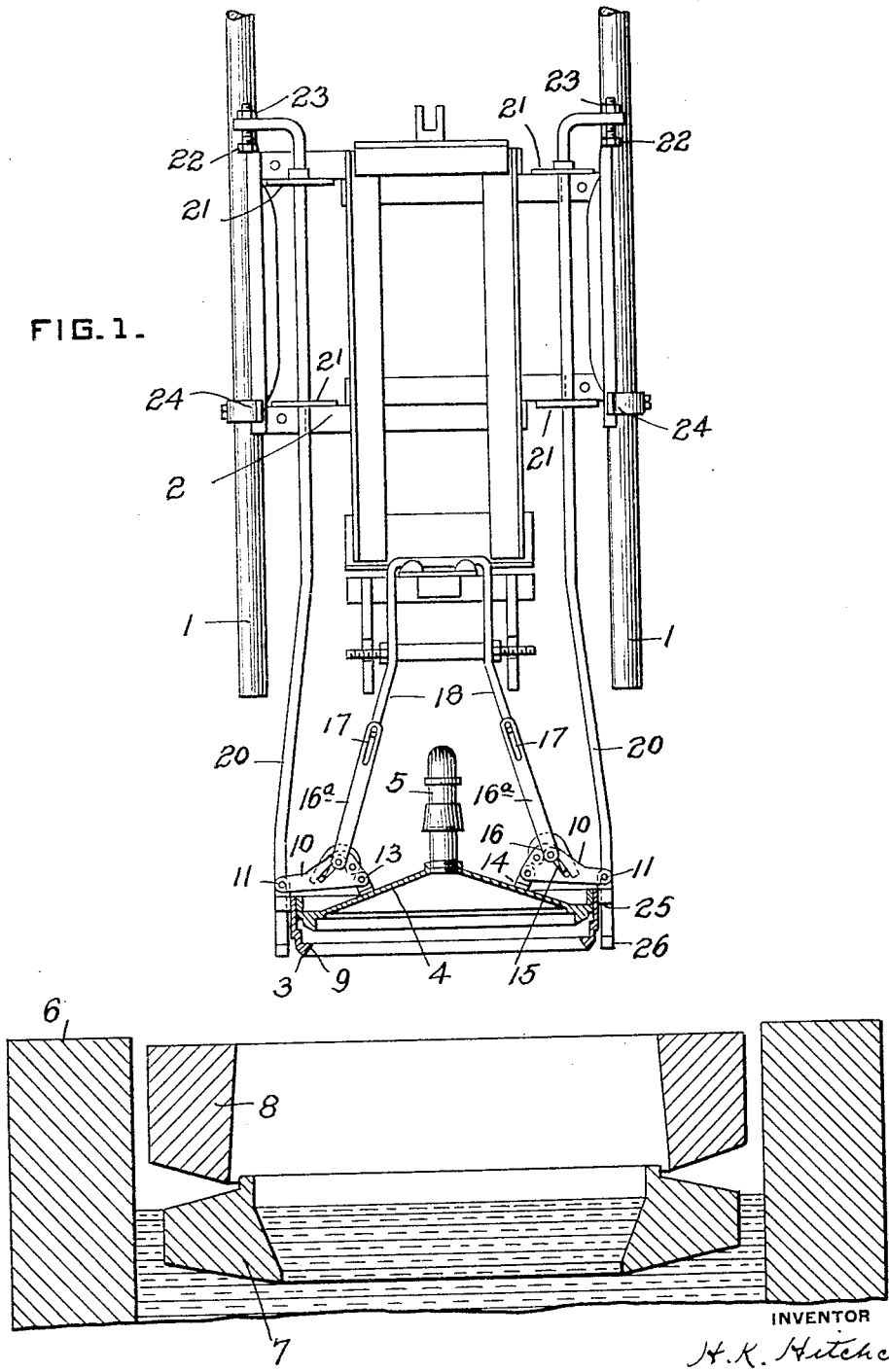

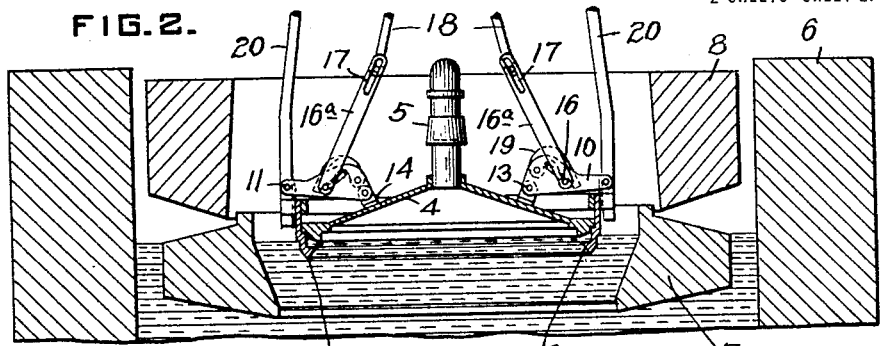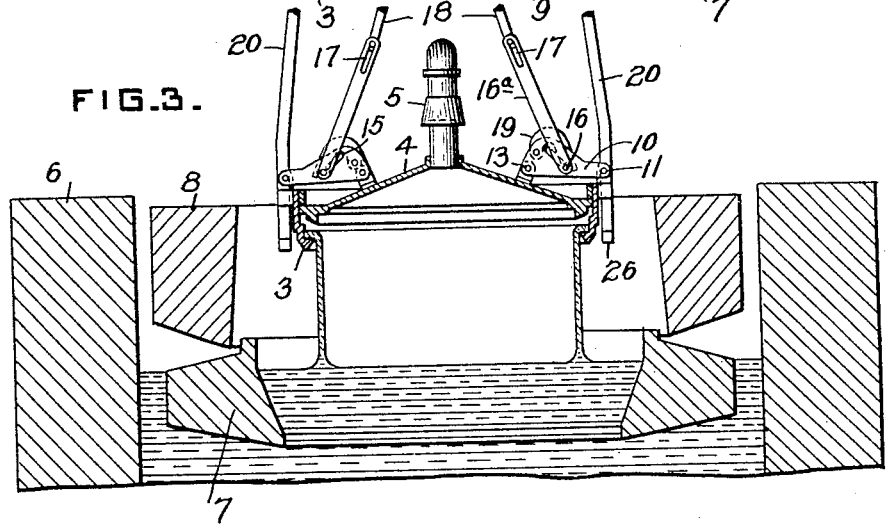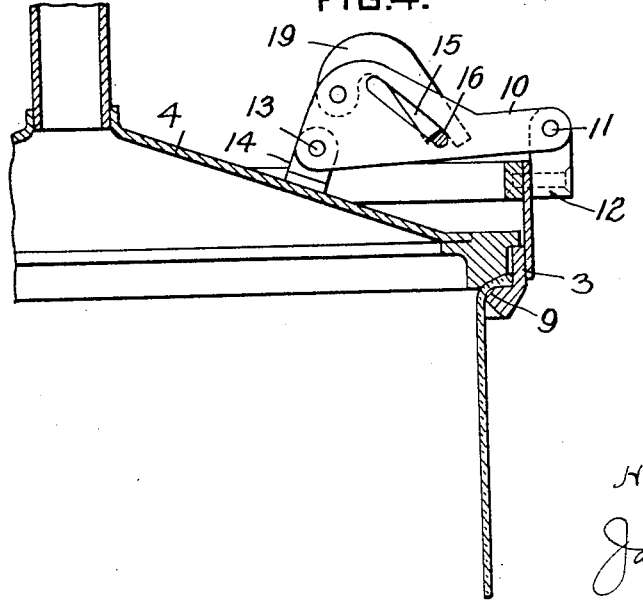

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

GLASS-DRAWING APPARATUS.

1,398,019.            Specification of Letters Patent.      Patented Nov. 22, 1921.

Application filed December 28, 1918. Serial No. 268,715.

*To all whom it may concern:*

Be it known that I, HALBERT K. HITCHCOCK, a citizen of the United States, and a resident of Pittsburgh, in the county of Allegheny and State of Pennsylvania, have made a new and useful Invention in Glass-Drawing Apparatus, of which the following is a specification.

The invention relates to a bait for use in drawing glass cylinders which are subsequently cut up into sheets for use in windows and for other purposes. The primary objects of the invention are the provision of an improved form of the so-called cold bait, (1) which can be used for drawing cylinders without the usual cap or neck, (2) which is automatic in operation, and (3) which can be conveniently and easily handled with a minimum amount of breakage in the cylinders drawn. One embodiment of the invention is illustrated in the accompanying drawing, wherein;

Figure 1 is an assembly view partially in section, showing the position of the parts of the bait just before the entry to the glass bath, Fig. 2 is a sectional view of the lower part of the apparatus after the bait has entered the glass bath, Fig. 3 is a view similar to that of Fig. 2, but with the parts in the position occupied after the bait has reached a position a short distance above the glass bath, and Fig. 4 is an enlarged partial section of the bait with the parts occupying the position of Fig. 2.

Briefly stated, the bait employed is made in two parts, movable toward and from each other, and both adapted to engage the supporting flange of the cylinder to be drawn when the bait is lowered into the glass. This gives a double chilling effect upon the flange of glass, causing it to set more rapidly than would otherwise be the case. The parts are so arranged that after the bait is moved upward from the bath of glass a short distance, the two parts of the bait are separated, thus relieving the clamping action upon the flange and leaving it free to move radially with respect to the portion of the bait upon which it is supported. The approach of the two bait parts is also caused automatically after the bait enters the glass, so that the ordinary manipulation of lowering and raising the bait secures the relative movements of the bait parts and no additional manual labor is required in connection with the handling of the apparatus. The arrangement makes practicable the use of a bait of the full diameter of the cylinder to be drawn, so that the loss of time incident to the drawing of the usual neck and cap upon a cylinder, where a cold bait is employed, is avoided. A cold bait having a diameter equal to that of the cylinder to be drawn has heretofore been found difficult to operate because the chilling effect of the bait upon the supporting flange of glass was not sufficient to cause a proper hardening of the flange, and as a result, the bait would often be pulled away from the cylinder. The present device, by providing a chilling effect upon both the upper and lower sides of the flange of glass, gives the necessary chilling and stiffening effect, so that the flange will not bend and become detached from the bait during the drawing operation.

Referring now to Fig. 1 of the drawings, the numerals 1 indicate the guides upon which the carriage 2 for supporting the bait is mounted; 3 and 4 respectively are the lower and upper portions of the bait, mounted to move toward and from each other; 5 is a pipe for supplying air to the interior of the cylinder, supported upon the bait, the connections by means of which the air is conducted to the pipe not being shown; 6 is a drawing tank or container for the bath of molten glass, and 7 and 8 are clay members from which the drawing occurs and having nothing to do with the present invention.

The lower bait member 3 comprises a ring with the ledge 9 for supporting the cylinder flange. This bait member is preferably made in two parts, as indicated in Fig. 4, and the upper part is connected to the bait member 4 by means of a pair of links 10, pivoted at 11 at their outer ends to brackets 12, carried by the lower bait member and pivoted at their inner ends at 13 to the brackets 14, carried by the upper bait member 4. These connecting links 10 are provided with inclined slots 15, and in these slots are mounted the pivot members 16 carried by the lower ends of the links 16ᵃ (Fig. 1). The links 16ᵃ have lost motion connections at 17 with other links 18 suspended from the carriage 2. These links 16ᵃ and 18 constitute the means for supporting the bait from the carriage. During the operation of the bait, the pivot members 16 (Fig. 4) either occupy a position at the lower ends of the slots 15, being at such time held in this position by the dogs 19, or else occupy a position at the upper ends of the slots, the dogs at such time being disengaged. The weight of the bait parts 4 and 3 is so proportioned that when the pivot members 16 are in the lower ends of the slots 15, as indicated in Fig. 4, the upper portion 4 of the bait member will overbalance the weight of the lower member 3, and the parts will occupy the closed position indicated in Fig. 4. On the other hand, if the pivot members 16 are in the upper ends of the slots 15, the weight of the lower bait member 3 will overbalance the weight of the upper bait member and the parts will occupy the separated position indicated in Fig. 1.

In order to cause the approach of the two bait members after the glass bath is entered, the rods 20 are employed, such rods being mounted for vertical movement through the plates 21 of the carriage, and having the upper ends turned outward, as indicated in Fig. 1, and provided with the bolts 22, held in adjusted positions by means of the lock nuts 23. The heads of these bolts 22 are adapted to engage the stops 24 mounted upon the guides 1, when the bait enters the glass. The lower ends of the rods 20 extend past outwardly projecting lugs 25, carried by the lower bait member 3, and such lower ends of the rods 20 are provided with lugs 26 adapted to engage the lugs 25 when the bait member moves down with respect to the rods.

Starting with the parts in the position of Fig. 1, the operation is as follows: The parts of the bait are separated at this time, since the pivot members 16 are in the upper ends of the slots 15, and the weight of the bait part 3 over-balances that of the part 4. The parts occupy this position until the bait enters the glass bath, as indicated in Fig. 2, at which time the stop members come into play, to cause the approach of the bait parts, the bolts 22 engaging the stops 24, so that the lower bait member can move down in the bath no farther. The upper bait member, however, is free to move down, thus occupying the position shown in Fig. 2 and resting against the flange of glass carried by the ledge 9. The weight of the carriage is not at this time imposed upon the bait, the lost motion connections at 17 preventing this and permitting the carriage to move down slightly without tending to cause any further downward movement of the bait parts. The downward movement of the carriage and the links 16ᴬ, with respect to the lower bait member, causes the pivot members 16 to move to the position shown in Fig. 4 at the lower ends of the slots 15, where they are engaged and held by means of the dogs 19.

The upward movement of the bait is now started, the two parts of the bait being kept in engagement with the flange of glass lying therebetween, since the weight of the upper part now over-balances that of the lower part, due to the fact that the pivot members 16 have been moved outwardly, thus increasing the lever arms between such members and the pivots 13 (Fig. 4). The parts occupy this position until the bait has reached a position a slight distance above the glass, as illustrated in Fig. 3, at which time the bait parts are separated, this separation being caused by the added weight of the glass cylinder, which causes the lower bait part to overbalance the upper bait part, so that the two parts separate as indicated in Fig. 3. This separation leaves the glass flange entirely free to move radially. The parts occupy this position until the cylinder is completely drawn. The cylinder may now be cut off at the bottom and taken down in any desired manner. Before starting another draw the dogs are released and the parts occupy the position indicated in Fig. 1, the operations as heretofore described being now repeated in the drawing of another cylinder.

It will be seen that the foregoing operation provides for giving additional chilling effect upon the glass flange supported in the bait, so that a flange of sufficient stiffness can be secured, and that at the same time the operation of the parts in the manner described avoids such a clamping of the glass flange between the bait parts as would tend to prevent its free movement and might cause its breakage. It will also be seen that the operation is entirely automatic, the two parts of the bait being caused to approach when the bait enters the bath, and being caused to separate after the bait has been moved a slight distance above the surface of the glass bath. The point above the glass bath at which the parts are caused to separate may be adjusted to suit conditions by the substitution for the links 10 of other similar links having longer or shorter slots.

What I claim is:

1. In combination, in apparatus for drawing glass cylinders from a body of molten glass, an annular bait provided upon its interior with a ledge for supporting a flange of glass, means for moving the bait vertically, a cooling member opposing the said ledge and movable toward and away therefrom, and means controlled by the movement of the bait for causing said cooling member to approach said ledge and engage the flange of glass lying above the ledge when the bait is lowered into the body of glass.

2. In combination, in apparatus for drawing glass cylinders from a body of molten glass, an annular bait provided upon its interior with a ledge for supporting a flange of glass, means for moving the bait vertically, a cooling member opposing the said ledge and movable toward and away therefrom, means for causing the cooling member to approach the ledge to engage the flange of glass which is formed above said ledge when the bait is dipped into the body of glass, and means controlled by the movement of the bait for moving the cooling member upward after the bait is moved above the body of glass.

3. In combination, in apparatus for drawing glass cylinders from a body of molten glass, an annular bait provided upon its interior with a ledge for supporting a flange of glass, means for moving the bait vertically, a cooling member opposing the said ledge and movable toward and away therefrom, and means controlled by the movement of the bait for causing said cooling member to approach said ledge and engage the flange of glass lying above the ledge when the bait is lowered into the body of glass, and for causing the cooling member to move upward after the bait is moved above the body of glass.

4. In combination in apparatus for drawing glass cylinders from a body of molten glass, a bait comprising a lower annular member having a ledge for supporting a flange of glass, and a second member movable up and down with respect to the annular member and comprising a ring member adapted to engage the flange of glass on the ledge when the second member is in lowered position, and automatic means for lowering the second member when the lower member is dipped into the body of glass.

5. In combination in apparatus for drawing glass cylinders from a body of molten glass, a bait comprising a lower annular member having a ledge for supporting a flange of glass, and a second member movable up and down with respect to the annular member and comprising a ring member adapted to engage the flange of glass on the ledge when the second member is in lowered position, and means controlled by the movement of the bait for causing an upward movement of the second member with respect to the lower member when the bait is raised above the body of glass.

6. In combination in apparatus for drawing glass cylinders from a body of molten glass, a bait comprising a lower annular member having a ledge for supporting a flange of glass, and a second member movable up and down with respect to the annular member and comprising a ring member adapted to engage the flange of glass on the ledge when the second member is in lowered position, and automatic means for causing a lowering of the second member when the lower member is dipped into the body of glass, and for causing an upward movement of the second member with respect to the lower member when the bait is raised above the body of glass.

In testimony whereof, I have hereunto subscribed my name this 19th day of December, 1918.

HALBERT K. HITCHCOCK.